Nov. 8, 1932.   F. CZEMBA   1,886,942
CUTTER
Filed Feb. 14, 1929
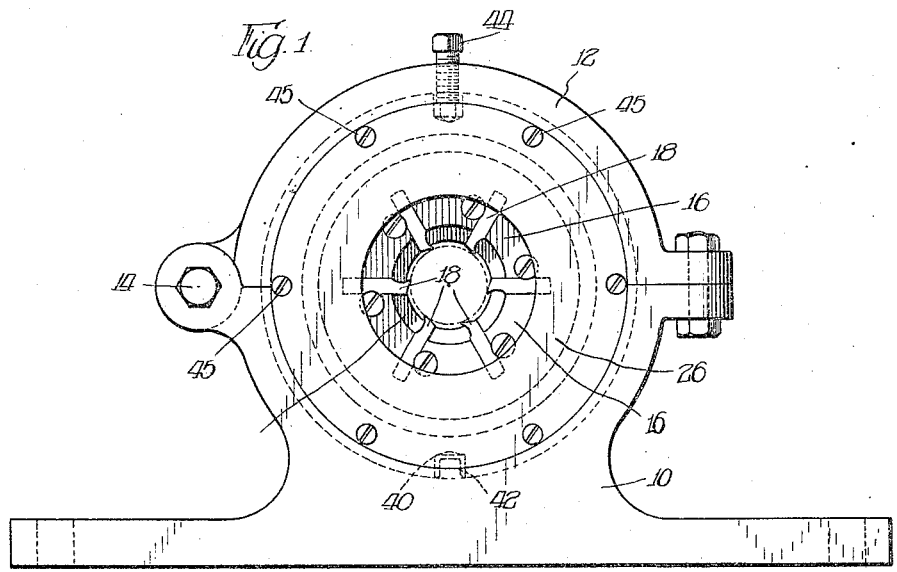
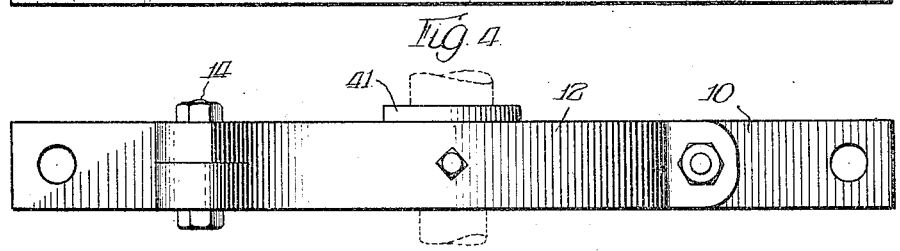
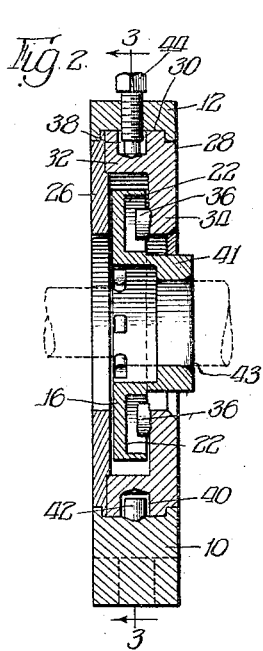
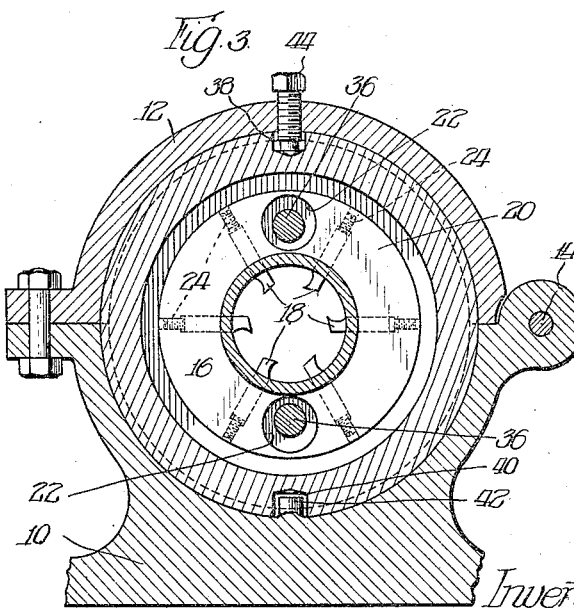
Inventor:
Frank Czemba Patented Nov. 8, 1932

1,886,942

UNITED STATES PATENT OFFICE

FRANK CZEMBA, OF DULUTH, MINNESOTA

CUTTER

Application filed February 14, 1929. Serial No. 339,857.

This invention relates to cutter assemblages and the like and is illustrated herein as embodied in an assemblage having a cutter head floatingly mounted therein.

In many instances, where elongated work pieces having irregular lengthwise contours, such, for example, as warped steel billets, are to be surfaced to remove imperfections, it is desirable merely to remove a uniform amount of material from the exterior of the work piece, without trying to correct its lengthwise irregularity. In such instances, owing to the irregular contour, it is necessary to support the work pieces in a carrier that is so movable relatively to the cutter as to cause each portion of the length of the pieces to be uniformly presented to the cutter regardless of the irregularities in lengthwise contour, or, to provide a cutter which is itself displaceable relatively to the work carrier whereby the cutter changes position according to the irregularities occurring in the work pieces.

The present invention relates to the latter class of devices and has for an important object thereof the provision of a novel and improved cutter the blades of which are readily displaceable.

Owing to the fact that severe strains and stresses are imparted to the cutter blades during a surfacing operation it is not advisable to provide springs or other flexible members for permitting displacement of the cutter blades, for such members are too easily susceptible of being bent beyond repair, broken, or otherwise rendered inoperative. Accordingly, an important feature of the present invention resides in the provision of a cutter assemblage comprising a casing, a cutter head mounted within the casing for displacement relatively thereto, and rigid means for limiting and controlling such displacement. In the illustrated embodiment of the invention the casing is stationary and the means for limiting displacement of the cutter head also prevents rotation thereof, and thus it will be appreciated that since the cutter head and the cutter blades are held against rotation, that the assemblage is adapted for use in machines in which the work pieces themselves are rotated as they are fed past the cutter blades.

Another feature of the invention consists in mounting the cutter head loosely in the casing so that between the limits of the displacement movement of the head is unopposed. This results in a floating mounting for the cutter head and permits it readily to change its position in accordance with changes in the surface contour of the work pieces.

In another aspect an important feature of the invention consists in the provision of a simple, and sturdy mounting for the cutter head that is susceptible of being easily disassembled to permit interchanging of heads to accommodate work pieces of various sizes.

Other objects and features of the invention will become apparent from a reading of the following specification in the light of the accompanying drawing, in which—

Figure 1 is a view in front elevation of a cutter embodying the invention;

Figure 2 is a view in side elevation in central section of the cutter shown in Figure 1;

Figure 3 is a view in front elevation in section taken along the line 3, 3 of Figure 2; and Figure 4 is a top plan view of the cutter shown in Figure 1.

As shown in the drawings the cutter comprises, generally speaking, a base 10 having a cover 12 pivoted thereto at the point 14, and an interiorly mounted cutter head 16 carrying a plurality of radially extending cutting knives 18.

As shown in Figures 2 and 3, the cutter head comprises a flat metal disk 20 having depressions or openings 22 formed therein and provided with threaded openings 24 for receiving adjusting screws for controlling the displacement of the cutter blades 18 relatively to the cutter head 16.

To the end of holding the cutter head in place relatively to the base 10 and the cover 12 of the cutter proper there are provided securing rings 26 and 28. The securing ring 28 is provided with an outer projecting part 30 that extends within a groove formed in the cutter base 10 and cover 12, with a main body portion 32 and an inwardly extending flange portion 34. Thus, when the cover 12 occupies an open position, the securing ring 28 may be inserted into the base 10 of the cutter with the projecting part of the ring disposed within the annular groove in the cutter with the result that the inwardly projecting flange portion 34 forms a side wall which tends to prevent escape in one direction of the cutter head 16 from the cutter. Similarly, the ring 26 is provided with a flange portion which projects inwardly to such an extent that it tends to prevent escape of the cutter head from the cutter in the opposite direction. By providing both of these flange portions the cutter head 16 cannot escape from its holder and by constructing the body portion 32 of the retaining ring 28 in such a manner that its interior diameter is greater than the exterior diameter of the cutter head the latter is permitted to move freely relatively to the cutter casing and the limit of such movement is governed only by engagement of the cutter head with the inner wall of the body portion 32. Thus, the cutter head is mounted for floating movement or adjustment relatively to the casing.

To the end of preventing rotation of the cutter head relatively to the casing, although still permitting limited floating movement of the head relatively to the casing, the inwardly projecting flange portion 34 of the retainer ring 28 is provided at diametrically opposite points with projections 36 that are disposed within the depressions or openings 22. Similarly, to the end of preventing rotation of the retaining ring 28 relatively to the casing the ring is provided at its upper and lower points with depressions 38 and 40 into which fit a rigid projection 42 and an adjustable projection 44.

In operation the cutter head 16 is permitted to float or move relatively to the casing, but is held against rotation so that when a rapidly rotating work piece is presented to the central opening in the cutter the latter changes its position in accordance with variations in lengthwise contour of the work piece. Thus, the work piece is uniformly surfaced from end to end notwithstanding variations in lengthwise contour. To assist a work piece in entering the central opening in the cutter, the cutter head is provided with an outwardly extending throat or entrance portion 41 having a chamfered inner edge 43 which facilitates the entrance of the extremity of the work piece into the cutter.

The extremely simple character of the cutter is to be stressed and this feature is emphasized by the small number of parts—there is only one moving part—as well as by the fact that it can be assembled and disassembled with ease and dispatch. For example, the cover of the casing may be lifted and the entire inner part of the cutter, including the retaining rings and the cutter head be removed as a unit. Thereafter, by means of screws 45 (Figure 1) the retaining ring 26 may be removed from the retaining ring 28 thereby permitting removal of the cutter from the rings. In assembling the cutter a reverse operation can be followed with equal facility. This feature comprising the pivoted cover for the casing not only allows ready removal of the cutter head but also serves to allow easy removal of the retainer rings or liners so as to permit interchanging of the liners for others of different size.

Although the invention has been illustrated and described herein with particular reference to a cutter head for use in resurfacing machines it is to be recognized in many respects the invention is not limited in its application to such devices and may be employed with equal success in devices of analogous character and may be used in performing similar operations. Furthermore, changes and modifications may from time to time be made in the illustrated embodiment of the invention without departing from the scope thereof.

Having thus described my invention, what I claim as new and desire to secure by United States Letters Patent, is:

1. A cutter assemblage comprising, in combination, a casing, a liner mounted within the casing, said liner comprising a first named flange portion engaged by the inner wall of the casing, and a second named flange portion offset from and extending inwardly, from one side of the first named flange portion, an annular disk secured to the opposite side of the first named flange portion, whereby an opening is formed between the disk and the second named flange portion, a cutter head loosely mounted within the opening for floating movement relatively to the side walls thereof, and means associated with the side walls for limiting the amount of movement of the cutter head.

2. A cutter assemblage comprising, in combination a casing including two hinged parts one of which may be moved relatively to the other, a liner mounted within the casing and provided with projections, a disk mounted in the casing and spaced from the liner, and a cutter head carried by the casing, said cutter head being located between the liner and disk and provided with openings for receiving the projections, whereby said cutter head is adapted to have engagement with the projections for limiting movement thereof.

3. A cutter assemblage comprising, in combination a circular casing, a groove located on the inner wall thereof, a liner mounted in said groove, said liner being provided with an inwardly directed flange portion, a disk mounted in said groove and provided with an inward flange spaced from the first mentioned flange, and a cutter head mounted for limited movement and located between said flanges.

4. A cutter assemblage comprising a two part circular casing, one of which is movable relatively to the other, a groove provided in the inner wall of said casing, a liner, a disk, said liner and disk being provided with inwardly extending flange portions and being mounted in said groove, and a cutter head mounted between said flange portions and having a limited relative movement in relation to the casing.

Signed at Duluth, Minnesota, this 31st day of January, 1929.

FRANK CZEMBA.